Feb. 26, 1946.   K. J. KOPPLIN   2,395,556
SELF-SEALING TANK
Filed Aug. 30, 1940
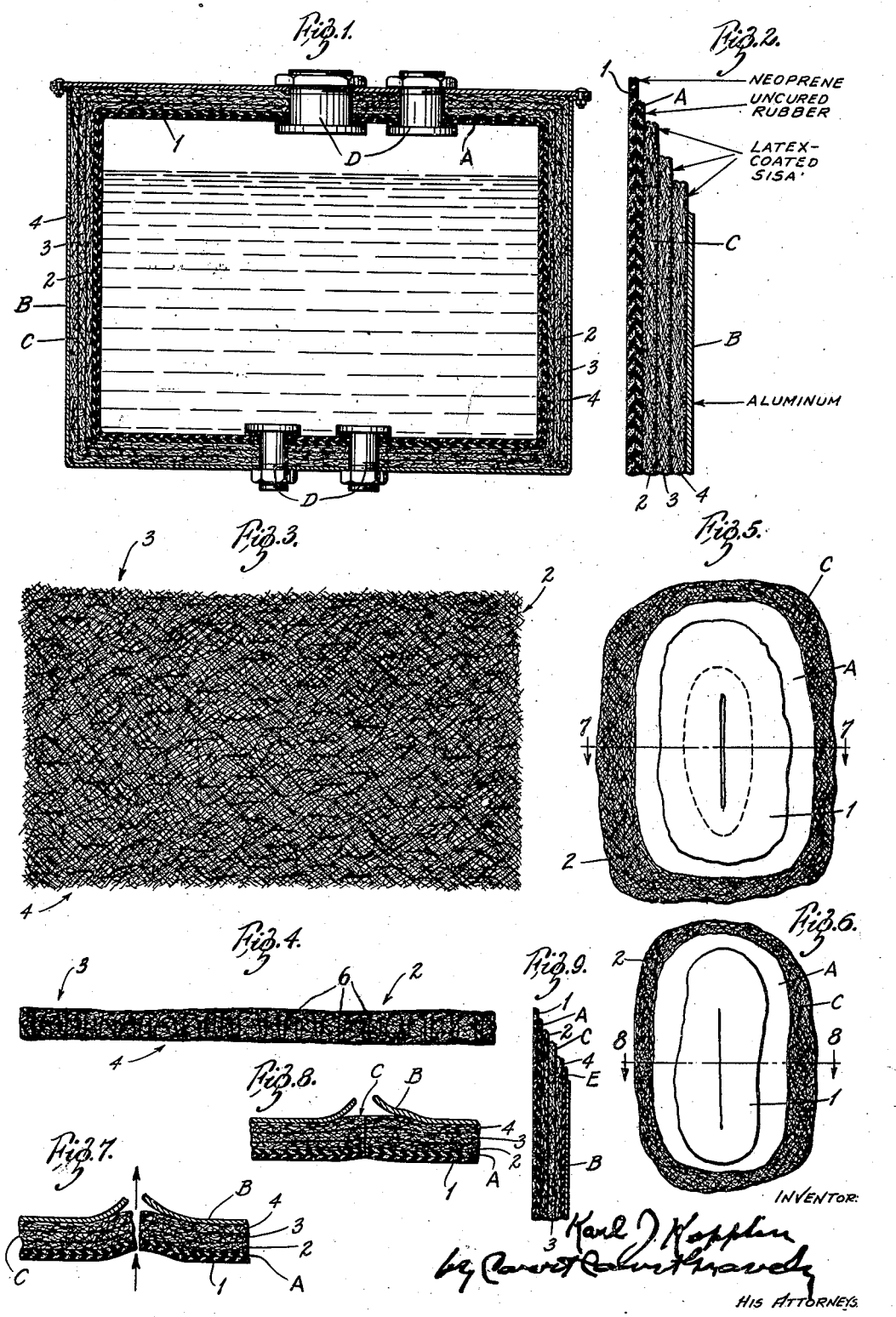
INVENTOR:
Karl J. Kopplin
HIS ATTORNEYS Patented Feb. 26, 1946

2,395,556

UNITED STATES PATENT OFFICE 2,395,556

SELF-SEALING TANK

Karl J. Kopplin, Normandy, Mo., assignor to F. Burkart Manufacturing Company, St. Louis, Mo., a corporation of Missouri Application August 30, 1940, Serial No. 354,856

6 Claims. (Cl. 154—43.5)

It has long been known that when uncured rubber is exposed to the action of gasoline or similar hydrocarbon compounds, the portion of the uncured rubber so exposed swells quickly. Many attempts have been made to utilize this fact in the production of fuel tanks which would be leak-proof against punctures; and some fuel tanks have been made that would, under favorable conditions, successfully seal small punctures. For instance, prior to my invention, there were fuel tanks which would successfully close a puncture made by a thirty calibre rifle bullet striking from the outside perpendicular to the near face of the tank, that is, the side of the tank nearest to the point of origin of the bullet. So far as I am aware, however, none of the tanks prior to my invention could successfully take care of the different conditions that affected the far side of the tank, that is, the side that the bullet struck, after passing through the liquid fuel therein, when larger calibre bullets were fired through these tanks. Accordingly, the principal object of the present invention is to devise a tank that will be self-sealing against large punctures and under difficult conditions. The invention consists principally in making the fuel container proper of uncured rubber covered by a gasoline resistant film or layer and a backing for said container in which a rifle bullet will make a fairly clean hole of approximately the size of the bullet without making any other appreciable change in the backing even in the region next to the hole. It also consists in the container proper and a stiff tank-like shell of metal, rubber or other suitable material enclosing said container with the backing filling the space between them. It also consists in the parts and combinations of parts hereinafter described and claimed.

In the accompanying drawing, wherein like reference numbers refer to like parts wherever they occur, Fig. 1 is a vertical sectional view of a fuel tank embodying my invention, Fig. 2 is an enlarged sectional view of a portion of the wall structure of said tank, Fig. 3 is a detail view of a section of matting of the kind used for backing the fuel container, Fig. 4 is a sectional view of such matting, Fig. 5 is a diagrammatic view of a portion of the inside of the tank showing a slit made therein by a bullet, the dotted line around the bullet slit indicating the concavity which the bullet tends to produce in materials heretofore used for backing, and the lips of the slit being spaced apart by reason of the rubber container being distended into such concavity, Fig. 6 is a diagrammatic view similar to Fig. 5 but illustrative of my invention, the slit being closed and the concavity in the backing being practically eliminated, Fig. 7 is a sectional detail view on the line 7—7 of Fig. 5, Fig. 8 is a sectional detail view on the line 8—8 of Fig. 6; and Fig. 9 is a view similar to Fig. 2 showing a modification wherein an extra layer of uncured rubber is used inside of and next to the outer shell.

According to the present invention, the fuel container proper is a bag A made of uncured rubber formed into the shape of the exterior shell B of the tank hereinafter mentioned. This rubber container is covered with a film or layer 1 of a substance which is resistant to the action of gasoline and similar hydrocarbons, such, for instance, as the synthetic rubber known by the trade-name of neoprene. Such synthetic rubbers are easily attached to uncured rubber with commercially available, gasoline resistant cements known to the trade; as, for example, neoprene cements. The synthetic rubber film thoroughly protects the uncured rubber from the action of the fuel.

Entirely surrounding the container A proper on all sides, top and bottom thereof, is a backing C against which the container bears throughout its surface without being directly bonded thereto. This backing consists of one or more plies of matting 2, 3, 4 made of unwoven, long fibres of sisal or similar material compacted, needled and coated with a small quantity of latex sufficient to bond individual surface fibres and thereby eliminate the tendency for loose ends of these surface fibres to carry through the opening when the backing material is punctured. It is known that woven metal and woven fabrics fail as backing materials, chiefly due to the fact that the ends of individual fibres, which have been broken by the impact of a bullet, are carried through the opening and thereby create resistance to the tendency of the fabric to decrease the size of the bullet hole and its tendency to return to its original plane without acquiring a permanent concavity around the hole.

Surrounding the fibrous backing C is a shell B of metal, hard rubber or other suitable material, preferably aluminum. The fibrous backing fits closely in the space between the outer shell B and the container A proper, with its outer surface bearing against the inner surface of the metal shell and with its inner surface bearing against the outer surface of the container proper. This backing is of great tensile strength and strongly reenforces the outer shell B against stresses that tend to burst it. The tank is provided with the usual fuel tank fittings D.

When a bullet penetrates the near side of the tank, gasoline enters the hole in the container A and comes in contact with the portion of the uncured rubber at the edge of the hole. This exposed portion of the uncured rubber swells quickly and closes the hole, the backing C, in the meanwhile, bearing against the container proper right up to the edge of the hole.

The conditions that affect the far side of the tank are quite different and far more difficult than those that affect the near side. In the first place, the bullet is usually tumbled in passing through the fuel and usually strikes the far side at an oblique angle, so that it makes a larger and more jagged hole in the far side than in the near side. Under these difficult conditions, a more or less elongated slit is cut through the rubber container A and a considerable concavity is formed in the metal shell. The same force that produces such concavity in the metal shell tends to produce a similar concavity in the backing but, as hereinafter explained, is ineffective to do so. If there were such concavity in the backing surrounding the puncture, the pressure of the liquid fuel, and especially the severe primary and secondary fuel surges from single hits or the recurrent fuel surge from successive machine gun hits would distend the rubber container into said concavity and thereby open up the slit in the uncured rubber. In consequence of this opening of the slit, the gasoline would be enabled to reach the uncured rubber and complete the solution of the portion thereof that had previously been only swelled. With solution of the uncured rubber the puncture would be fully open.

Experience has shown that with each bullet there is an initial surge of liquid fuel immediately followed by a secondary surge of apparently greater intensity. It is due to this fact that some prior constructions which have successfully sealed direct thirty calibre hits fail entirely to seal fifty calibre holes made by tumbled bullets in the far side of the tank. Experiment has further shown that successive machine gun bullets fired in bursts intensify this hydraulic surge to the extent of straining, deforming and bursting light gauge aluminum tanks. On the other hand, my tank construction has successfully sealed against gasoline leak holes made by fifty calibre machine gun bursts that would break open the seams of a welded aluminum tank built in accordance with ordinary aircraft weight limitations. This capacity to seal bullet holes to the point at which the tank or plane structure fails, insures the maximum fuel tank efficiency so essential in actual combat, and so far as I am aware, is found only in my tank construction.

As stated above, the backing of my device can be punctured by a rifle or machine gun bullet without any appreciable concavity being formed therein. The backing material right up to the hole is virtually in the same position after the shot as it was before. Consequently, the backing is effective to prevent distension of the portion of the rubber container surrounding the puncture and, therefore, prevents the opening of the slit under the pressure due to the head and surge of the fuel. It is chiefly in this respect that prior constructions fail; that is plywood, laminated fabrics, felts and to a lesser degree sponge rubber all exhibit a tendency to shatter or tear out enough backing to render the tank unsuitable for combat planes under the adverse conditions indicated.

In practice, I prefer to make my matting of unwoven sisal fibre laid in layers, the fibres of each layer being substantially parallel with each other but at an angle to the fibres of the next adjacent layer or layers. The mat thus formed is initially very loose, but it is compressed between rollers and then sewn or needled and coated with a thin film of latex or like elastic material. The matting thus formed is loose and open in comparison, for instance, with felt or fibre reinforced plastics but it has considerable rigidity and can be inserted between the container proper and the enclosing metal shell under compression sufficient to exert some pressure inwardly against the container.

In accordance with one illustrative but non-limiting example of my invention, the fuel tank was constructed as follows:

An inner lining of neoprene .020 inch thick, weighing .109 pound per square foot was cemented to a container of uncured rubber .200 inch thick, weighing .83 pound per square foot. This container was then backed with three independent plies of latex-coated sisal matting, each ply being about one quarter of an inch thick and weighing .25 pound per square foot and being coated with 15 grams of latex per square foot on each side of each ply. This container and backing were then placed in an aluminum tank with the neoprene inside and the fibre matting against the aluminum shell. The assembled tank was then strapped in place on a platform and filled to within three inches of the top with gasoline through a suitable opening provided. Firing tests were then made with one burst of three rounds from a thirty calibre machine gun at fifty yards. The tests were continued by firing bursts of fifty calibre, standard U. S. Army ball and armor piercing bullets into the tank without any substantial leakage until the external metal tank structure failed from the hydraulic pressure generated within the tank by successive passage of these large calibre machine gun bullets.

The following is the probable explanation of the peculiar efficiency of my backing: in the manufacture of the matting, that is used as a backing, the fibres are laid in loose layers to a height of several inches and then compressed between pressure rollers to a thickness of about one-quarter of an inch more or less and, while they are still under the influence of the roll pressure, they are stitched or needled together by forcing certain of the fibres transversely through the matting and bending the projecting portions of the loops or bights 6 back against the surface of the matting by passing the matting between pressure rolls coated with liquid latex. Thus, if it were not for the fact that the needling or stitching prevents, the natural resiliency of the individual fibres would increase the thickness of the matting as soon as it got beyond the influence of the pressure rolls; but this tendency is opposed by the stitches or needled loops which constitute ties or tension elements that keep the greater proportion of the fibres under the stress initially imposed by the pressure rollers, the efficiency of such tension elements being increased by the bonding action of the latex between the rebent ends of the needle loops and the surface of the matting. If a bullet pierces the matting it destroys one or more of the stitches or needled loops and thereby relieves the fibres in the immediate neighborhood of the bullet hole from the constraint and stress initially imposed by the pressure rolls, whereupon their natural resiliency enables them to expand the thickness of the matting in the immediate neighborhood of the bullet hole and thereby avoid the formation of a concavity in the surface of the mat immediately around the bullet hole. Besides, some of the fibres, due to their own resiliency and that of the other fibres may spring or be forced sideways into the bullet hole and thereby decrease the size thereof. Thus, my backing is shatterproof and free from the objections incident to brittleness or insufficient tensile strength. For instance, sponge rubber is objectionable because penetration by a tumbled fifty calibre bullet is likely to knock out enough sponge rubber to leave the uncured rubber container proper with insufficient support adjacent to the hole. On the other hand, my backing is free from the objection that would attach to a ductile substance, namely, that a bullet is likely to form a considerable concavity therein and thereby unfit the backing of the very purpose for which it is intended.

My sisal matting has considerable tensile strength and its surface is rough. Consequently, when a number of plies of matting are used they are arranged so that the meeting ends of each ply are distant from the meeting ends of other plies. By this arrangement, the rough surfaces of the plies take strong hold of each other and serve to splice together the meeting ends of the adjacent ply.

In the modification shown in Fig. 9, a layer E of rubber, preferably uncured, is interposed between the backing and the metal shell and is especially useful in cushioning shocks to which the tank may be subjected.

In addition to the ability to seal bullet holes, a tank of my construction greatly reduces the danger of bursting fuel containers in crashes or forced landings due to the strength of the fibre backing and due to the fact that it is relatively so inelastic that it affords much greater protection than low tensile backing materials such as sponge rubber. For this reason my tank construction is not limited to military aircraft or in fact to aircraft but is of value in commercial airplane construction and military conveyances such as land tanks, armored motor cars, motor boats and other devices.

What I claim is:

1. A fuel tank comprising an uncured rubber container having a layer of synthetic rubber insoluble in gasoline cemented to its inside surface, an outer tank, and a backing of unwoven sisal matting between said container and said outer tank, said matting being compressed and needled to form ties for keeping said matting under compression whereby, if a tie is shot loose, the portion of the matting next to the shot hole will increase in thickness and press back and hold the lips of the hole in place.

2. A fuel tank comprising an uncured rubber container having a coating of synthetic rubber insoluble in gasoline, an outer tank, and a backing of unwoven sisal matting between said container and said outer tank, said matting having tension elements extending therethrough by which it is held under compression whereby said matting is enabled to increase in thickness in the region of a tension element that fails.

3. A fuel tank comprising an uncured rubber container having an inside coating of synthetic rubber insoluble in gasoline, an outer tank, and a backing of a plurality of layers of unwoven sisal matting between said container and said outer tank, said matting having tension elements extending therethrough by which it is held under compression whereby, if a tension element is destroyed, the matting is enabled to increase in thickness adjacent to the place occupied by said element.

4. A fuel tank comprising an uncured rubber container having its inside surface coated with synthetic rubber insoluble in gasoline, an outer tank, a layer of uncured rubber inside of and next to said tank, and a backing of unwoven sisal matting between said container and said layer, said matting having tension elements extending therethrough by which it is normally held under compression whereby said matting is enabled to increase in thickness in the region of a tension element that fails.

5. The combination of a metal fuel tank and a leakproof lining therefor, said lining comprising a plurality of plies, the innermost ply being made of uncured rubber coated on the side next to the center of the tank with a synthetic rubber insoluble in gasoline, the next adjacent plies consisting of matting of unwoven sisal, said matting being compressed and needled to form ties for keeping said matting under compression whereby, if a tie is shot loose, the portion of the matting next to the shot hole will increase in thickness and press back and hold the lips of the hole in place.

6. The combination with a metal fuel tank of a leak-preventing lining therefor, said lining comprising an innermost layer of uncured rubber coated with synthetic rubber insoluble in gasoline and layers of needled unwoven latex-coated sisal matting surrounding said uncured rubber.

KARL J. KOPPLIN.